Jan. 10, 1967  A. M. MESHULAM  3,296,674
HOSE CLAMP
Filed July 13, 1965  2 Sheets-Sheet 1
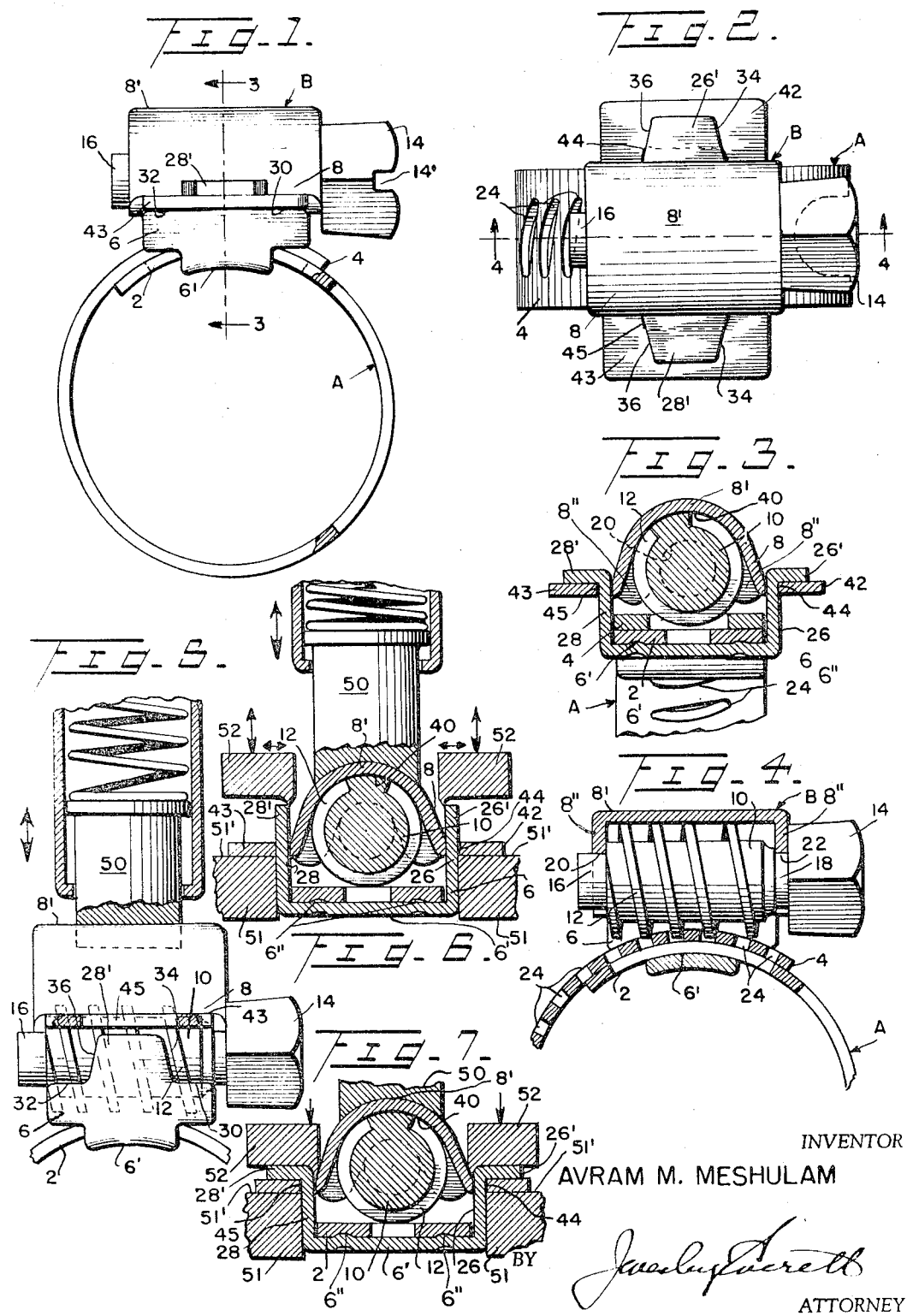
INVENTOR
AVRAM M. MESHULAM
BY
ATTORNEY

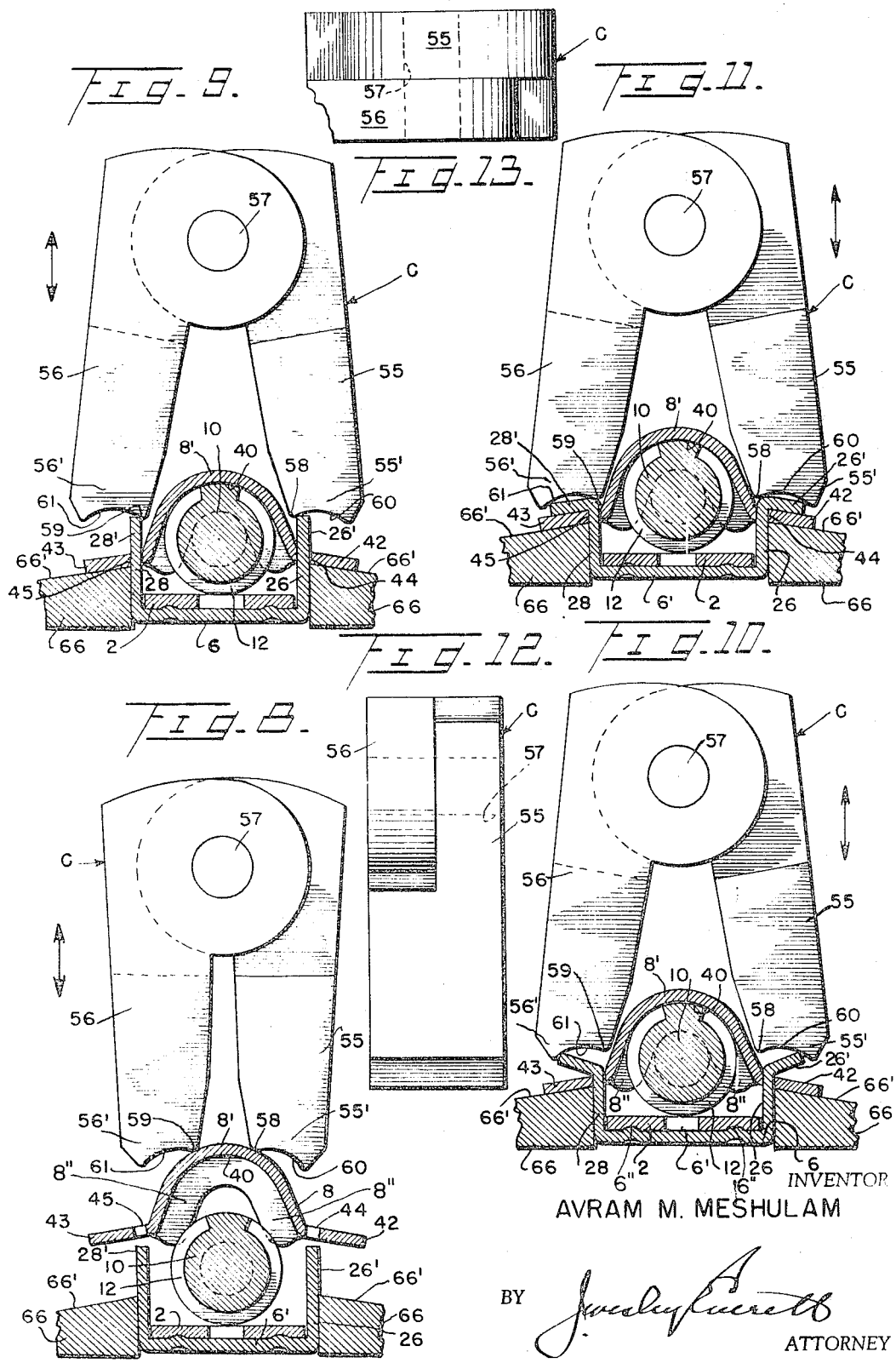

United States Patent Office 3,296,674
Patented Jan. 10, 1967

3,296,674
HOSE CLAMP
Avram M. Meshulam, 15 Linden Terrace,
Baltimore, Md. 21208
Filed July 13, 1965, Ser. No. 471,630
2 Claims. (Cl. 24—274)

The present invention relates to a hose clamp and in particular to a band type having a tangential spiral threaded screw for moving the band.

The structure of the present clamp specifically provides for the production of clamps of relatively small dimension which must be precisely formed in order that they perform in an advantageous and correct manner. Primarily the invention relates more specifically to a particular structure and for a method of forming the holding and moving means for the band.

One object of the invention is to form a relatively small holding means of rugged construction for the screw and band and capable of efficient and easy operation.

Another object of the invention is to provide a screw and band holding unit formed of two major parts that, when assembled, is practically incapable of being twisted out of operating position by the operation of the screw when the band is placed under high tension.

Another object of the invention is to provide an improved method of assembling the screw and band holding unit.

While several objects of the invention have been noted, other objects, uses and advantages will become apparent from the following description when taken in connection with the accompanying drawings, which is set forth by way of illustration and example showing the embodiment of the invention.

In the drawings:

FIGURE 1 is a side elevational view of the clamp.

FIGURE 2 is a plan view of the same.

FIGURE 3 is a sectional view of the assembled clamp taken on line 3—3 of FIGURE 1.

FIGURE 4 is a sectional view taken on line 4—4 of FIGURE 2.

FIGURE 5 is a side elevational view in section of the screw and band holding means showing the beginning of the assembly of the two-part screw and band holding unit, together with the screw.

FIGURE 6 is a fragmentary cross-sectional view of the screw and band holding means and die for performing a further operation in the assembly of the two parts of the screw and band holding means.

FIGURE 7 is a cross-sectional view of the screw and band holding unit and die similar to that shown in FIGURE 6 wherein the die operation connecting the two parts of the screw and band holding means is completed.

FIGURE 8 is a fragmentary cross-sectional view of the screw and band holding unit showing a modified form of assembly means for the said parts.

FIGURE 9 is a cross-sectional view similar to that shown in FIGURE 8 showing the assembly means in a further progressive operating position in assembling the said parts.

FIGURE 10 is a cross-sectional view similar to that shown in FIGURE 9 showing the assembling means in still another progressive operation in the assembling of the said parts.

FIGURE 11 is a cross-sectional view similar to that shown in FIGURES 9 and 10 showing the assembly means in its final position in assembling the said parts.

FIGURE 12 is a side elevational view of the modified form of the assembling means.

FIGURE 13 is a plan view of the same.

In referring to the drawings like reference characters are used to indicate like and similar parts throughout the several views.

The clamp comprises an open end band A, a band operating screw and a screw and band holding unit B. The band A is of substantially circular form, having its ends unconnected and overlapping one another, that is, the free end portion 4 overlaps the free end portion 2, as shown best in FIGURES 1 and 4.

The screw and band holding unit B is formed in two parts, a bottom member 6 and a top member 8 to form a hollow housing. Positioned longitudinally of the screw and band holding unit B is a rotatable screw 10 having spiral threads 12 extending over the central portion of the screw, as shown, in FIGURE 4. The screw is provided with a head 14 positioned outwardly at one end of the screw shank having a slot 14' for rotating the screw by a suitable tool. The screw is provided with a bearing 16 adjacent one end and a bearing 18 adjacent the head for supporting the screw within journals 20 and 22 carried by the top member 8 of the unit B, which will be referred to later in more detail.

The bottom member 6 is provided with a flat transverse central section 6' which is slightly curved along its longitudinal axis to receive the free ends 2 and 4 of the band. The width of this flat portion 6' is sufficient to slidably receive the said band ends. To this portion 6' of the member 6, the end 2 of the band, which is the inner free end of the band A, is fixedly secured by spot welding, as shown at 6" in FIGURES 6 and 7, or by some other known equivalent method. The outer overlapping end 4 of the band is provided with transverse slots 24. The end 4 of the band A is adapted to overlay the end 2, and extends within the path of the threads 12 of the screw 10, and is movable through the unit B in either direction by rotating the screw 14.

Referring again to the unit B and to the bottom member 6, this member is generally of U shaped cross-sectional form, having side sections 26 and 28 integrally formed with the flat section 6' extending upwardly at right angles to the flat portion at its lateral edge. The two side sections have extended inwardly from their longitudinal ends, steps 30 and 32, and reduced portions 26' and 28' extending beyond the steps. The lateral edges of the portions 26' and 28' are preferably provided with a taper, as shown at 34 and 36, FIGURE 5.

The top member 8 is provided preferably with an arcuated central section 8' having a concave inner surface 40. The top portion is also provided with end sections 8" and 8"' having the journals 20 and 22 positioned axially with the elongated axis of the member 8 for receiving the bearings 20 and 22 of the screw. These end sections are formed substantially in parallel planes, which planes are substantially perpendicular to the elongated axis of the member 8. The top member is further provided with lateral side sections 42 and 43 formed integral with the arcuated top section 8'. Extending through the lateral side sections 42 and 43, are slots 44 and 45. These slots are adjacent and close to each side of the arcuated portion 8'. The slots are of such size and spaced at such distances as to coincide with the position of the extended portions 26' and 28' of the side sections of the bottom member 6. The width of the slots 44 and 45 are such that the steps 30 and 32 rest upon the side sections 42 and 43 of the top member 8 beyond the ends of the slot when the two members are assembled. The slots are preferably of such length as to engage the tapered portions 34 and 36 of the portions 26' and 28' to form a substantially tight fit between the ends of the slots and the members 26' and 28'.

Prior to assembling the two members 6 and 8, the screw 10 is inserted longitudinally between the members before the members are united to form a hollow housing into which the screw is operable. The tapered members 26' and 28' extend through the slots until the steps 30 and 32 come in contact with the side sections 42 and 43 of the top member 8.

At this point of the assembling of the two members 6 and 8, the portions 26' and 28' of the side walls of the lower member are bent outwardly and downwardly as shown in FIGURE 3 until the said portions are in pressed contact with the portions 42 and 43.

The members 6 and 8 from which the hollow housing is made are formed from die operations well known in the art.

One way of assembling these two members, or parts 6 and 8, is shown in FIGURES 5 to 7. In FIGURE 5 there is shown the band A having its inner lapped end 2 fixed to the bottom member 6, as previously described. The screw 10 is placed longitudinally within and between the side sections 26 and 28 of the bottom member. Placed above the member 6 is a top member 8. The reduced tapered portions 26' and 28' of the side members 26 and 28 of the bottom member 6 are placed in alignment with the slots 44 and 45 provided in the extended side sections 42 and 43 of the top member 8. The two side members are then pressed into contact by a spring-loaded plunger 50, as shown in FIGURES 5 and 6. The members 6 and 8 are moved together to a point where the steps 30 and 32 come in contact with the side sections 42 and 43 of the top member 8, as shown best in FIGURE 6. The bottom member 6 is normally held in a fixture 51 which also acts as an anvil by being provided with flat surfaces 51'. The anvil surfaces are adapted to receive the lateral side sections 42 and 43 of the member 8. When the members 6 and 8 have been advanced to the point where the upwardly extended bottom side portions 26' and 28' have reached the point where they are fully extended through the slots 42 and 43, the portions 26' and 28' are bent outwardly over the upper surfaces of the side sections 42 and 43 into a pressed fit therewith by the die members 52, which move downwardly and progressively outwardly as the die moves downwardly toward the face 51' of the member 51. This outward movement of the die member 52 may be accomplished by using the arcuated housing as a cam, but is not limited thereto.

The bending of the members 26' and 28' is accomplished by a bending tool 52 moving in the direction as indicated by the arrows shown in FIGURES 5, 6 and 7. FIGURE 7 shows the position of the housing assembly at the completion of the bending operations.

A modified form of fixture for assembling the screw and the hollow housing 6 and 8, is shown in FIGURES 8 to 13. As the screw and the parts of the screw holding and moving means are identical, the same numerals are used in reference to these parts to avoid confusion. In this form of assembly, the fixture for uniting the members 6 and 8 is formed in a single unit as shown at C and is designed to accomplish the entire assembly by a single reciprocating operation. The fixture C is constructed of two hinged jaw members 55 and 56, hingedly connected by a pin 57. This assembling fixture is adapted to reciprocate along an axis perpendicular to the elongated axis of the two members 6 and 8.

The assembly of the screw and the bottom and top members 6 and 8 is substantially the same as previously described. The assembling of the two members 6 and 8 and the screw 10 by the modified form of fixture begins with the jaws 55 and 56 being in an upwardly position, as shown in FIGURE 8. As the fixture C moves in the direction of the top member, as indicated by the arrow in FIGURE 8, the inner edges 58 and 59 contact the outer surface adjacent the center of the arcuated portion 8' pressing the top member 8 into contact with the bottom member 6, as shown in FIGURE 10. When the top member reaches its designated position relative to the bottom member 6, the lower ends 55' and 56' of the hinged jaw members 55 and 56 spread apart, and the inner adjacent edges 58 and 59 of the jaw portions 55' and 56' engage the outer end portions 26' and 28' of the bottom side sections 26 and 28 and, along with the aid of the slightly concave surfaces 60 and 61 formed in the operating end of the jaws 55 and 56, press against the outer ends of the portions 26' and 28' forcing them outwardly as shown in FIGURE 10, and finally completing the bending operations of the side portions 26' and 28', as shown in FIGURE 11.

The holding fixture 66 is substantially the same as the holding element 51 previously described and differing only in the angle of the surface 66' and is interchangable with the fixture 51. The surface 66' is angled downwardly at an acute angle from vertical planes pasing along the vertical edge of the lower portions of the side walls 26 and 28 of the bottom member 6. The present structure and the method of forming the clamp provides a rigid and practical improvement in the construction of small hose clamps.

While the clamp and the method of assembling have been shown and described in a specific form, it is not intended as a limitation. Only so far as the invention has been particularly defined in the accompanying claims is the same to be limited.

I claim:

1. A hose clamp assembly including a circular formed open end band having one end overlapping the other wherein the outer lapped end of the band is provided with transverse slots and means for holding the unslotted end of the band and means for moving the slotted end over the unslotted end, comprising:

(a) the means for holding and moving the band being in the form of a hollow single unit having a length greater than its width, said unit being formed from at least two parts, a lower member and an upper member formed from a rigid sheet-like material of substantially the same thickness;

(b) a spiral threaded screw rotatably mounted longitudinally of the said hollow housing, said screw having an elongated shank portion about which is formed intermediately thereof a spiral thread, bearings about the screw shank and each end of the spiral thread, and a head extending outwardly from one end of the shank portion beyond the adjacent bearing for providing means for connecting the screw to a separate tool for rotating said screw;

(c) the lower member having its central section substantially flat in cross-section and two opposite parallel side sections formed at right angles with and at each side of the flat central section, the width of the central section being such as to slidably receive the ends of the circular band, the inner lapped end of the band being fixedly secured to the central flat section of the lower member, the side sections of the lower member having a step at each end of each of the side sections at a predetermined distance from the plane of the flat section and extending inwardly from then end thereof for a predetermined distance toward the center of the said side sections, the central portion of each of the said side sections extending outwardly beyond said steps for a predetermined distance;

(d) the upper member of the hollow housing unit having a central section of cross-sectional arcuated form having end sections at each end thereof providing journals therein for rotatably receiving the screw bearings and the sides of said upper member each terminating at the lower edge thereof in an outwardly extending lateral section which is provided with an aperture at the junction thereof with the side of said upper member and of such dimensions as to receive the extended portions of the lower side wall said extended portion extending beyond the said steps extending through the said slots, said extended portions being bent outwardly and downwardly into engagement with the upper surface of said outwardly extending lateral sections thereby forcing said lateral sections downwardly into engagement with said steps and securely clamping said lower and upper members together.

(e) whereby the size of the hollow housing formed between the lower and upper members and the size of the screw and the spiral threads carried thereon, are such as to engage the lateral slots carried by the outer lapped end of the band for moving the band through the housing by rotating the said screw.

2. A hose clamp as claimed in claim 1 wherein the central portion of each of the side sections extending outwardly beyond the said steps being slightly tapered inwardly toward their outer ends.

References Cited by the Examiner

UNITED STATES PATENTS

| 1,497,339 | 6/1924 | McCann | 29—513 |
| 1,641,265 | 9/1927 | Gaynor. | |
| 2,395,273 | 2/1946 | Hill et al. | 24—274 |
| 2,990,599 | 7/1961 | Gustavsson | 24—274 |

FOREIGN PATENTS 951,148  10/1956  Germany.

WILLIAM FELDMAN, *Primary Examiner.*

D. GRIFFIN, *Assistant Examiner.*